United States Patent
Gordon

(10) Patent No.: US 11,254,357 B2
(45) Date of Patent: Feb. 22, 2022

(54) OFFSET TIE ROD JOINT

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 205 days.

(21) Appl. No.: 16/460,838

(22) Filed: Jul. 2, 2019

(65) Prior Publication Data

US 2020/0010114 A1 Jan. 9, 2020

Related U.S. Application Data

(60) Provisional application No. 62/693,807, filed on Jul. 3, 2018.

(51) Int. Cl.
*B62D 7/16* (2006.01)
*F16C 11/06* (2006.01)
*B62D 7/20* (2006.01)

(52) U.S. Cl.
CPC .............. *B62D 7/16* (2013.01); *B62D 7/20* (2013.01); *F16C 11/0623* (2013.01); *F16C 2326/24* (2013.01)

(58) Field of Classification Search
CPC ......... B62D 7/16; B62D 7/20; F16C 11/0623; F16C 2326/24; F16C 7/06; F16C 9/04; F16C 11/0614; F16C 7/02; F16C 2326/26; B60G 7/003; B60G 2206/124; B60G 2206/50; B60G 2300/07; B60G 2206/1112; B60G 2204/416; B60G 2204/148; B60G 2200/144; B60G 2200/422; B60G 2200/44; B60G 3/20; B60G 7/005
See application file for complete search history.

(56) References Cited

U.S. PATENT DOCUMENTS

| | | | | |
|---|---|---|---|---|
| 3,007,728 A | * | 11/1961 | Hoffman | F16C 11/0661 403/132 |
| 5,503,418 A | * | 4/1996 | Schmidt, Jr | B62D 7/16 280/93.511 |
| 6,047,789 A | * | 4/2000 | Iwanaga | B62D 17/00 180/440 |
| 9,988,083 B1 | * | 6/2018 | Smith | F16C 11/0695 |
| 2004/0108674 A1 | * | 6/2004 | McGaughy | B60G 7/008 280/93.512 |
| 2005/0035091 A1 | * | 2/2005 | Rakers | F16C 11/0695 219/107 |
| 2007/0256659 A1 | * | 11/2007 | Anderson | B60G 15/067 123/198 R |

(Continued)

*Primary Examiner* — Darlene P Condra
(74) *Attorney, Agent, or Firm* — Rutan & Tucker LLP; Hani Z. Sayed

(57) ABSTRACT

An apparatus and a method are provided for an offset tie rod joint for vehicle steering systems. The offset tie rod joint comprises a ball rotatably retained within a casing that is disposed in an opening of an offset housing. A threaded shank fixedly coupled with the offset housing is received by a steering rod. The opening is displaced from a longitudinal axis of the threaded shank by a distance that provides clearance between the offset housing and a spindle assembly during articulation of the spindle assembly during steering. A rear backstop and a front snap-ring in a groove retain the casing within the opening. A bore extending through the ball receives a bolt that fixates the ball between parallel prongs of the spindle assembly. A misalignment spacer on each side of the ball provides clearance for rotation of the ball within the offset housing.

4 Claims, 5 Drawing Sheets

(56) References Cited

U.S. PATENT DOCUMENTS

| | | | | |
|---|---|---|---|---|
| 2008/0240847 | A1* | 10/2008 | Crouse | B62D 17/00 403/122 |
| 2008/0303234 | A1* | 12/2008 | Me | B62D 7/18 280/93.511 |
| 2012/0306174 | A1* | 12/2012 | Schmid | B60G 7/006 280/86.751 |
| 2014/0153999 | A1* | 6/2014 | Holmes | F16C 11/0619 403/134 |
| 2014/0265202 | A1* | 9/2014 | Bunker | B62D 7/18 280/93.512 |
| 2015/0192107 | A1* | 7/2015 | Kirchman | F03D 9/00 416/1 |
| 2016/0097421 | A1* | 4/2016 | Murata | F16C 11/0623 403/76 |
| 2018/0281538 | A1* | 10/2018 | Gordon | B60B 27/0052 |
| 2018/0290511 | A1* | 10/2018 | Gordon | B60G 17/00 |

* cited by examiner

OFFSET TIE ROD JOINT

PRIORITY

This application claims the benefit of, U.S. Provisional Application No. 62/693,807 filed Jul. 3, 2018, the entirety of each of the aforementioned application is incorporated by reference in its entirety into this application.

FIELD

The field of the present disclosure generally relates to vehicle steering systems. More particularly, the field of the invention relates to an offset tie rod joint that improves the mechanical strength and performance of vehicle steering systems.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scuff, and the like.

Double wishbone suspensions may be used in a wide variety of vehicles, including heavy-duty vehicles, as well as many off-road vehicles. Off-road vehicles may often come in a Side by Side variety. The Side by Side is a four-wheel drive off-road vehicle that typically seats between two and six occupants, and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms", although the arms may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

A system is provided for an offset tie rod joint for a vehicle steering system, the offset tie rod joint includes a ball rotatably retained within a casing, an offset housing including an opening that receives the casing, a bore extending through the ball and configured to receive a bolt that is configured to fixate the ball between parallel prongs of a spindle assembly, a threaded shank fixedly coupled with the offset housing and configured to be received by a steering rod, and a misalignment spacer disposed on each of opposite sides of the ball and is configured to provide clearance for rotation of the casing on the ball.

In an exemplary embodiment, the opening is displaced from a longitudinal axis of the threaded shank by a distance that provides clearance between the offset housing and the spindle assembly during articulation of the spindle assembly with respect to the steering rod.

In another exemplary embodiment, a rear of the opening includes backstop and a front of the opening includes a groove configured to receive a suitably-sized snap-ring.

In another exemplary embodiment, the backstop and the snap-ring disposed in the groove are configured to retain the casing within the opening.

In another exemplary embodiment, a weld-in tube end is coupled with the offset housing in lieu of the threaded shank and configured to receive the steering rod.

In another embodiment, a lock-nut that may be threadably engaged with the threaded shank and rotated into forcible contact with the steering rod, the lock-nut being configured to fixate the threaded shank and the steering rod.

In another exemplary embodiment, the threaded shank is configured with either left-hand threads or right-hand threads.

In another exemplary embodiment, the bore and the bolt are configured to mount the ball to the spindle assembly, the bolt being configured to threadably extend through suitable threaded holes in the parallel prongs and through the bore so as to fixate the ball between the parallel prongs.

In another embodiment, each misalignment spacer is configured to be received into a suitable countersunk hole in the ball.

In another exemplary embodiment, the ball and the misalignment spacer disposed on each of opposite sides of the ball are machined as a single component includes an extended ball.

In another embodiment, the ball and the casing are comprised of stainless steel that is surface-treated with a suitable polytetrafluoroethylene (PTFE) formulation, such that the ball and the casing exhibit self-lubricating properties.

In an exemplary embodiment, a lubricating race is disposed between the ball and an interior of the casing and configured to ensure sufficient lubrication is available to the ball and casing during operation.

In another exemplary embodiment, the lubricating race is comprised of an injection molded Teflon impregnated Nylon race that is configured to ensure smooth and precise movement of the ball within the casing.

In another exemplary embodiment, the ball and the casing are comprised of PTFE-treated stainless steel.

In an exemplary embodiment, the lubricating race is comprised of a thin chamber between the ball and the interior of the casing, the thin chamber being finable with a lubricant suitable to lubricate movement between the ball and the casing.

In another embodiment, the ball is comprised of 52100 bearing steel and the casing is comprised of machined 4130 chromoly.

In another exemplary embodiment, the ball and the casing are heat-treated and hard-chrome finished so as to improve corrosion resistance.

In another exemplary embodiment, the ball and the casing are cryogenically treated to improve wear resistance.

BRIEF DESCRIPTION OF THE DRAWINGS

The drawings refer to embodiments of the present disclosure in which.

Figure 1:
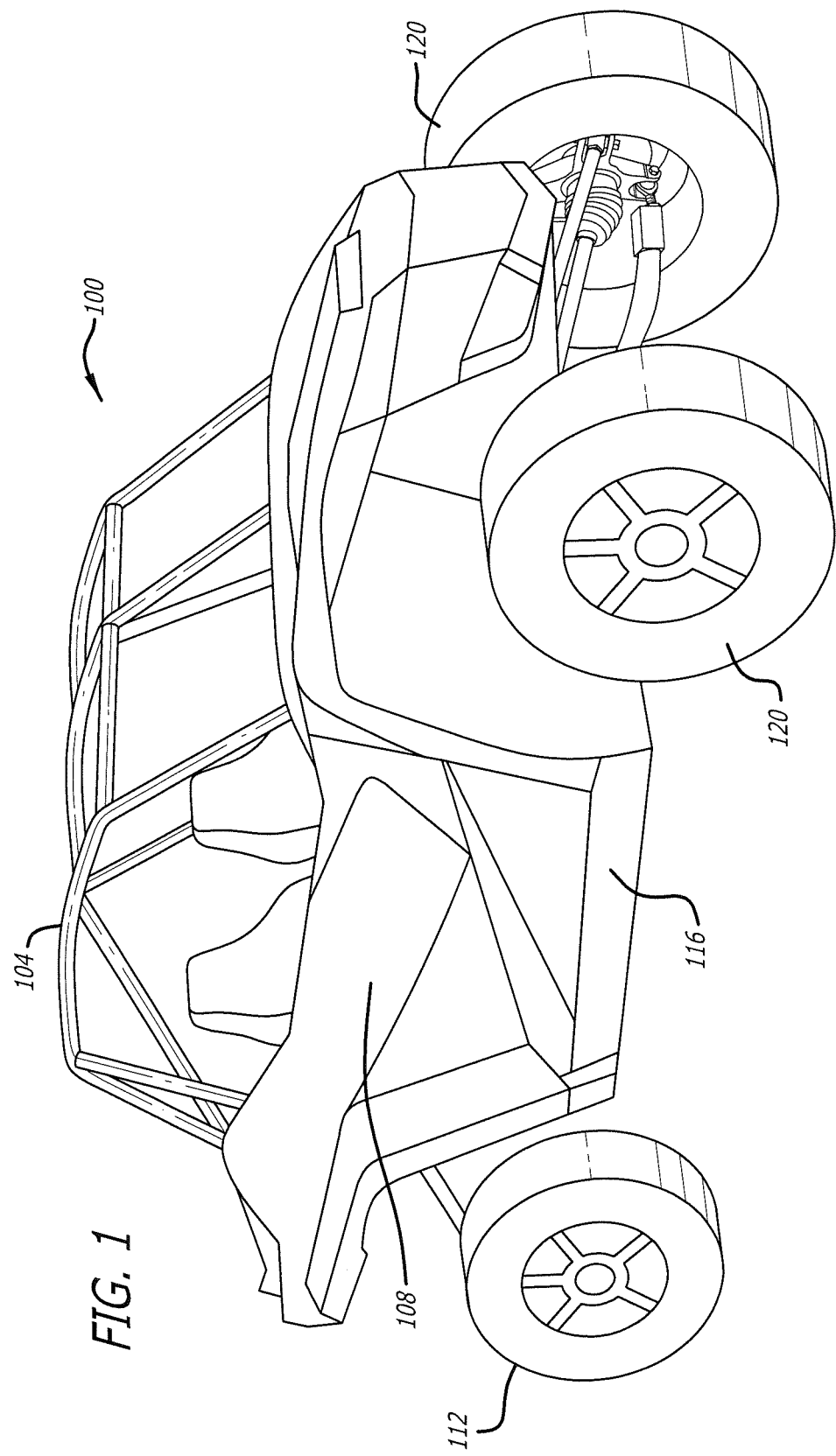
FIG. 1 illustrates an exemplary embodiment of an off-road vehicle that is particularly suitable for implementation of offset tie rod joints in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an offset tie rod joint for vehicle steering systems. The offset tie rod joint comprises a ball rotatably retained within a casing disposed in an opening of an offset housing. A threaded shank fixedly coupled with the offset housing is configured to be received by a steering rod. The opening is displaced from a longitudinal axis of the threaded shank by a distance that provides clearance between the offset housing and a spindle assembly during articulation of the spindle assembly with respect to the steering rod. A rear of the opening includes backstop and a front of the opening includes a groove configured to receive a suitably-sized snap-ring. The backstop and the snap-ring in the groove are configured to retain the casing within the opening. A bore extending through the ball is configured to receive a bolt that fixates the ball between parallel prongs of the spindle assembly. A misalignment spacer disposed on each of opposite sides of the ball provides clearance for rotation of the ball within the offset housing.

FIG. 1 shows an off-road vehicle 100 that is particularly suitable for implementation of an off-road steering system in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front-left and -right wheels 120, 125 may be operably coupled with the chassis 116 by way of the front suspension system disclosed herein. It should be understood, however, that the front suspension system of the present disclosure is not to be limited to the off-road vehicle 100, but rather the front suspension system may be incorporated into a wide variety of off-road vehicles, other than UTVs, without limitation.

Figure 2:
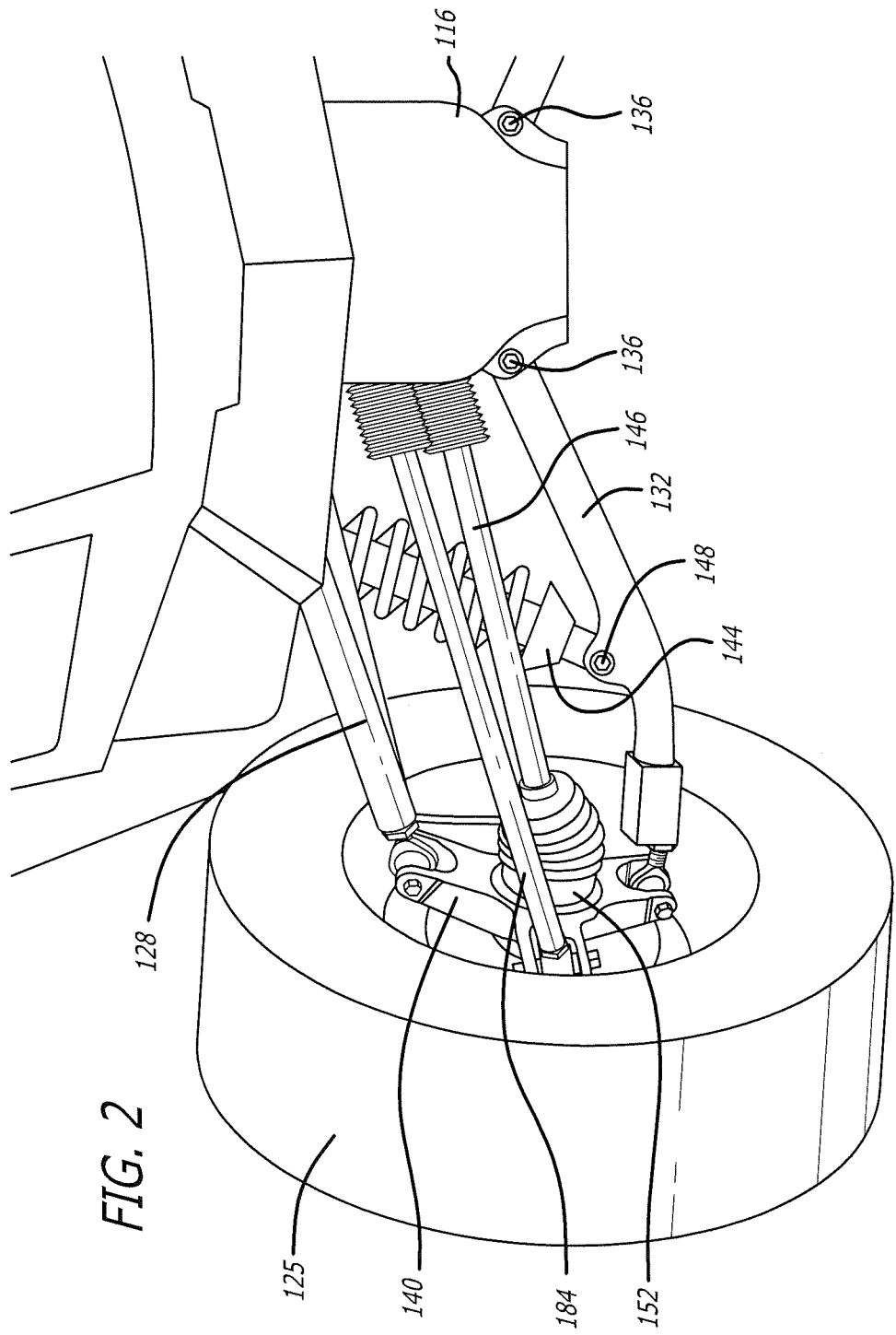
FIG. 2 illustrates a front view of an off-road vehicle comprising an off-road steering system.

FIG. 2 illustrates a front view of a front suspension system 124 that is configured to couple the front-right wheel 125 with a passenger side of the off-road vehicle 100. The front suspension system 124 is comprised of an upper suspension arm 128 and a lower suspension arm 132 that couple the front-right wheel 125 with the chassis 116. Each of the upper and lower suspension arms 128, 132 comprises two inboard mounting points 136 to the chassis 116 and one outboard mounting joint to a spindle assembly 140. As will be recognized, the upper and lower suspension arms 128, 132 may be a double wishbone style suspension that facilitates controlling of various parameters affecting the orientation of the front-right wheel 125 with respect to the off-road vehicle 100, such as, by way of non-limiting example, camber angle, caster angle, toe pattern, roll center height, scrub radius, and scuff.

It should be understood that although the front suspension system 124 is disclosed specifically in connection with the passenger side of the off-road vehicle 100, a driver side front suspension system is to be coupled with a driver side of the off-road vehicle. It should be further understood that the driver side front suspension system is substantailly identical to the front suspension system 124, with the exception that the driver side front suspension system is configured specifically to operate with the driver side of the off-road vehicle 100. As will be appreciated, therefore, the driver side front suspension system and the front suspension system 124 may be configured as reflections of one another across a longitudinal midline of the off-road vehicle 100. As such, references to the front-right wheel 125 may be substituted by mirrored embodiments encompassing the front-left wheel 120.

As further shown in FIG. 2, a strut 144 that is comprised of a shock absorber and a coil spring is mounted to the lower suspension arm 132 by way of a lower pivot 148. An upper pivot (not shown) couples a top of the strut 144 to the chassis 116. The strut 144 is configured to control vertical articulation of the front suspension system 124 due to movement of the front-right wheel 125 as the off-road vehicle 100 travels over bumpy terrain. The upper suspension arm 128 may be suitably configured, such as in the form of a J-arm, so as to facilitate coupling the strut 144 between the lower suspension arm 132 and the chassis 116 in lieu of being coupled between the upper suspension arm and the chassis. Experimental observation has shown that the lower position of the strut 144 generally facilitates a lower center of gravity of the off-road vehicle 100 and a relatively smaller shock angle, as well as reducing the need for extending the strut towers through and above a hood of the off-road vehicle 100.

Figure 3:
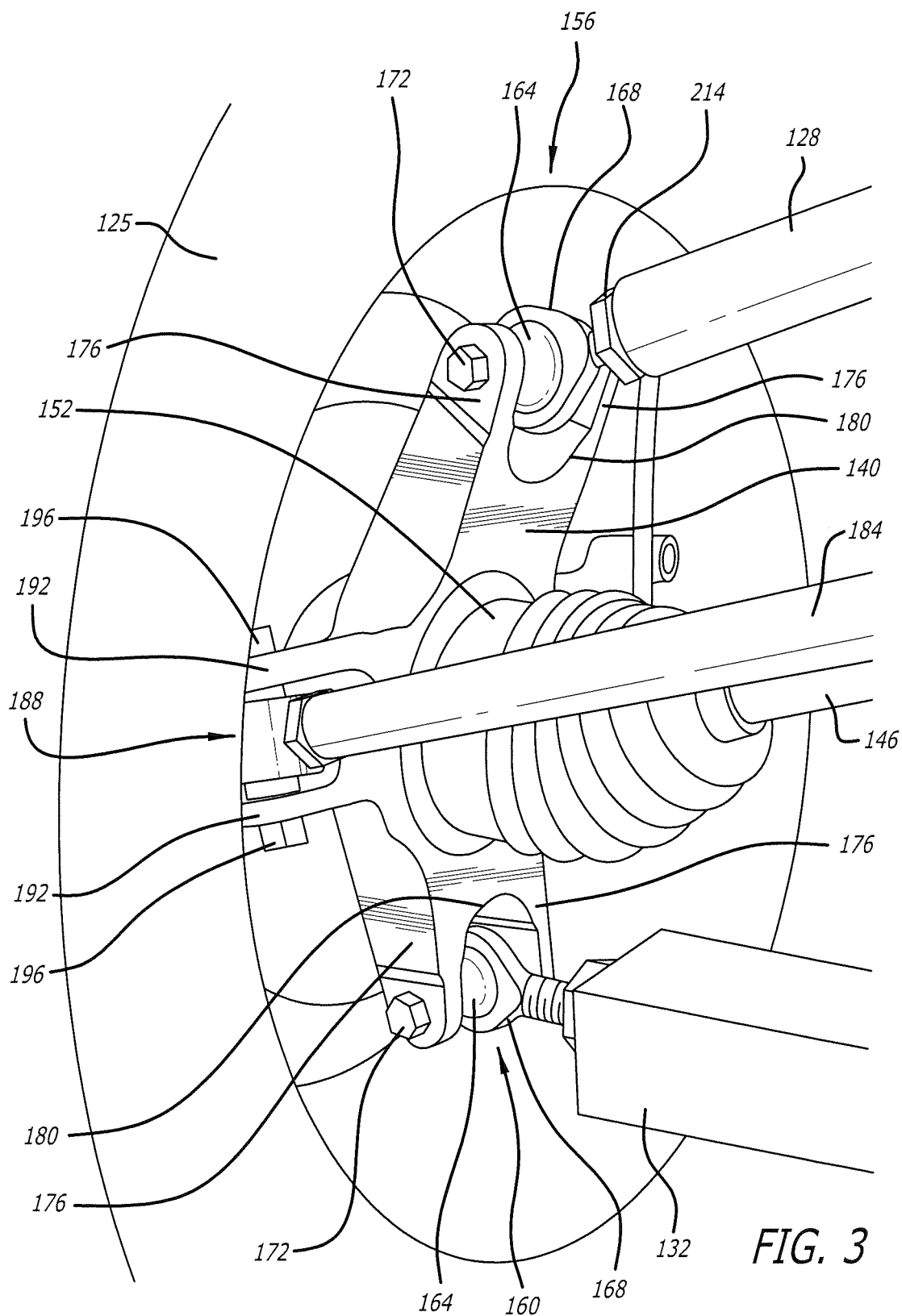
FIG. 3 illustrates a front view of an off-road steering system coupled with a spindle assembly.

With continuing reference to FIG. 2, a drive axle 146 is coupled between a transaxle and the front-right wheel 125. The drive axle 146 is configured to conduct torque from the transaxle to the front-right wheel 125 and accommodate vertical pivoting motion of the front suspension assembly 124 in response to road conditions. As best shown in FIG. 3, the drive axle 146 is comprised of a constant velocity (CV) joint 152 that is coupled with the spindle assembly 140 onto which the front-right wheel 125 is mounted. The CV joint 152 allows uninterrupted torque transmission from the transaxle to the front-right wheel 125 during vertical pivoting of the front suspension assembly 124 due to road conditions. As will be appreciated, the spindle assembly 140 generally supports the CV joint 152 and the front-right wheel 125 by way of one or more roller bearings (not shown).

With reference to FIG. 3, the spindle assembly 140 is pivotally coupled with the upper and lower suspension arms 128, 132. An upper rod-end joint 156 couples the upper suspension arm 128 to the spindle assembly 140, and a lower rod-end joint 160 couples the lower suspension arm 132 to the spindle assembly. Preferably, the upper and lower rod-end joints 156, 160 are of a Heim joint variety, wherein each of the joints is comprised of a ball 164 that is movable within a casing 168 that is threadably coupled with each of the suspension arms 128, 132. A bolt 172 fastens each of the balls 164 between a pair of parallel prongs 176 extending from the spindle assembly 140. It is contemplated that a recess 180 disposed between each pair of parallel prongs 176 has a shape and a size that are suitable to fixedly receive the ball 164 and allow for a desired degree of movement of the casing 168 on the ball. Thus, during vertical motion of the spindle assembly 140, as well as during horizontal rotation of the spindle assembly 140 due to steering, the balls 164 rotate within their respective casings 168, allowing the upper and lower suspension arms 128, 132 to pivot with respect to the spindle assembly 140.

Additionally, it will be recognized by those skilled in the art that the upper and lower rod-end joints 156, 160 are similar to Clevis fasteners. For example, each pair of parallel prongs 176 is similar to a Clevis, the bolt 172 is similar to a Clevis pin, and the ball 164 and casing 168 are similar to a tang. As such, similar to Clevis fasteners, each of the upper and lower rod-end points 156, 160 provides two shear planes that may withstand twice the incident force that may be withstood by single shear joints that are used in conventional front suspensions.

As further shown in FIG. 3, a steering rod 184 couples the spindle assembly 140 with a steering system of the off-road vehicle 100. The steering rod 184 is coupled with the spindle assembly 140 by way of an offset tie rod joint 188 that is similar to the upper and lower rod-end joints 156, 160. As will be appreciated by those skilled in the art, many embodiments of the offset tie rod joint 188 employ joints of the Heim-joint variety. A pair of parallel prongs 192 and a bolt 196 hingedly couple the offset tie rod joint 188, and thus the steering rod 184, with the spindle assembly 140. As will be further appreciated by those skilled in the art, the offset tie rod joint 188 can allow vertical and horizontal rotational motion of the spindle assembly 140 during operation of the off-road vehicle 100.

In the embodiment illustrated in FIG. 3, the offset tie rod joint 188 is coupled with the spindle assembly 140 forward of the drive axle 146, thereby providing a leading-edge steering system to the off-road vehicle 100. Experimentation has demonstrated that a leading-edge steering system similar to those shown in FIG. 3 may advantageously decrease leverage of the offset tie rod joint 188 and steering rod 184 of the front-right wheel 125, thereby substantially reducing bump steer that may occur due to forces exerted on the front wheel by rough terrain.

Figure 4:
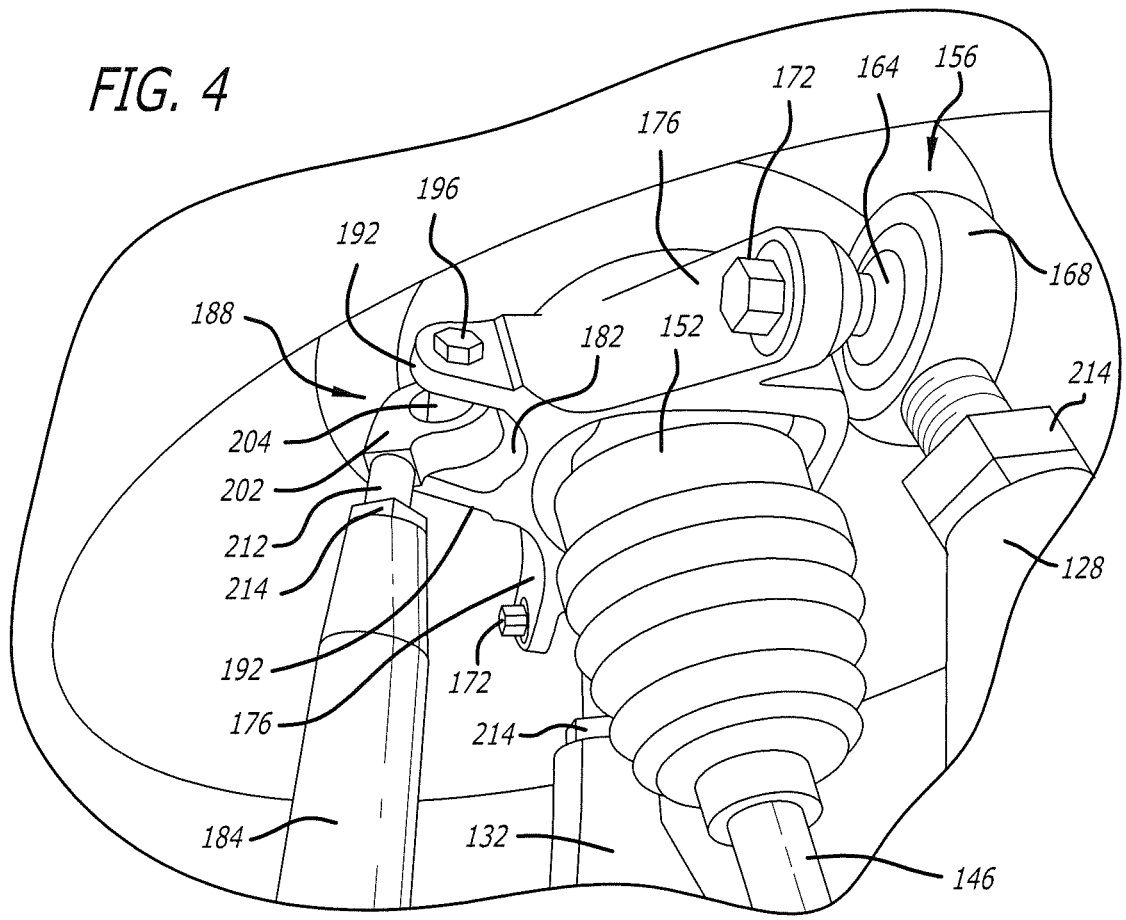
FIG. 4 illustrates a top view of an exemplary embodiment of an offset tie rod joint coupled with a spindle assembly.

FIG. 4 illustrates a top view of an exemplary embodiment of the offset tie rod joint 188 comprising a leading-edge steering system that is coupled with the spindle assembly 140, as described hereinabove. As shown in FIG. 4, the steering rod 184 is coupled with the spindle assembly 140 by way of the offset tie rod joint 188 disposed forward of the drive axle 146. As described hereinabove, the offset tie rod joint 188 may generally be a Heim-joint that can allow vertical and horizontal rotational motion of the spindle assembly 140. Opposite of the offset tie rod joint 188, the steering rod 184 is coupled with a steering gear (not shown) that is mounted onto a central location of the chassis 116. During operating the off-road vehicle 100, turning the steering gear clockwise moves the steering rod 184 toward the spindle assembly 140, causing the front-right wheel 125 to turn rightward. Turning the steering gear counterclockwise moves the steering rod 184 away from the spindle assembly 140, thereby turning the front-right wheel 125 leftward.

While traveling over rough terrain, the steering rods 184 of the leading-edge steering system are exposed primarily to tensile forces, unlike, for example, tie-rods utilized in conventional trailing-edge steering systems that primarily endure compression forces. It will be recognized by those skilled in the art that the steering rod 184 may support a greater load in tension than in compression, even though the yield strength of steel is generally independent of tension and compression. As will be further appreciated by those skilled in the art, a tensile force can require many sections of the steering rod 184 to yield before failure occurs, whereas compression forces can elicit failure of the steering rod 184 due to buckling via a relatively lower force acting at a weak section of the rod. Therefore, under the action of the compression force, failure of the steering rod 184 may occur when virtually any one section of the steel fails rather than requiring almost all sections to fail as with tensile forces. As such, the leading-edge steering system may be capable of withstanding relatively greater forces from rough terrain use than may be tolerated by conventional, trailing-edge steering systems.

With continuing reference to FIG. 4, the offset tie rod joint 188 may be comprised of a ball 204 that is retained within an offset housing 202, such that the ball 204 can be rotated within the housing 202. A threaded shank 212, or a weld-in tube end, can be fixedly coupled with the offset housing 202 so as to enable coupling the offset tie rod joint 188 to the steering rod 184. The threaded shank 212 may be fixedly coupled with the steering rod 184 by way of a lock-nut 214 that may be threaded onto the shank 212 and rotated into forcible contact with the steering rod 184. It is contemplated that the threaded shank 212 may be configured with left-hand threads or right-hand threads, without limitation.

Figure 5:
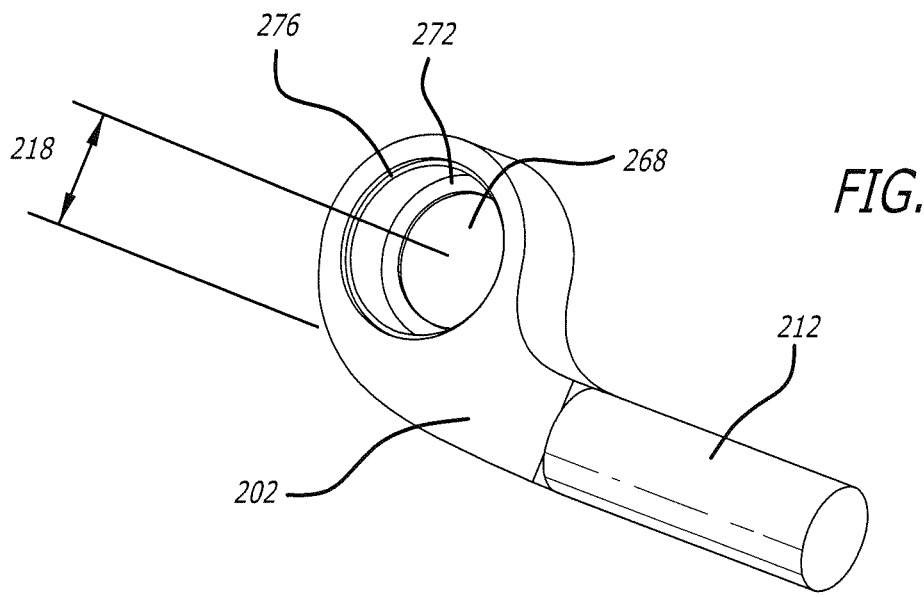
FIG. 5 illustrates an isometric view of an exemplary embodiment of an offset housing for an off-road steering system in accordance with the present disclosure.

FIG. 5 illustrates an isometric view of an exemplary embodiment of the offset housing 202 in absence of the ball 204 and the spindle assembly 140 shown in FIG. 4. The offset housing 202 comprises an opening 268 configured to receive the ball 204 such that the ball may be rotated within the offset housing 202, as described herein. The opening 268 is displaced from the longitudinal axis of the threaded shank 212 by an offset distance 218. The offset distance 218 can provide clearance between the offset housing 202 and the spindle assembly 140 so that the offset tie rod joint 188 may articulate without the housing 202 pressing against the bottom of a recess 182 between the parallel prongs 192, shown in FIG. 4.

As further shown in FIG. 5, a backstop 272 may be disposed at a rear end of the opening 268. The backstop 272 typically comprises a narrowing of the opening 268 that serves to prevent a casing 208 (see FIGS. 6A-6B) that supports the ball 204 from sliding out of the rear end of the opening 268. A groove 276 disposed at a front end of the opening 268 is configured to receive a suitably-sized snap-ring 280 (see FIGS. 6A-6B). Once installed into the groove 276, the snap-ring 280 prevents the casing 208 from exiting the front end of the opening 268. Thus, the backstop 272, the groove 276 and the snap-ring 280 can cooperate to retain the casing 208 and the ball 204 within the housing 264, as shown in FIG. 4.

Figure 6A:
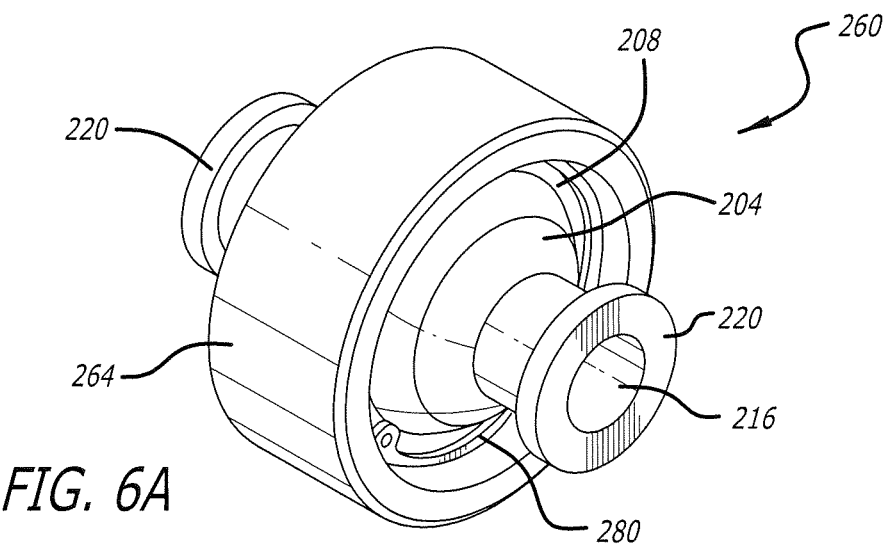
FIG. 6A illustrates an isometric view of an exemplary embodiment of a monoball assembly configured for implementation in an offset tie rod joint, according to the present disclosure.
Figure 6B:
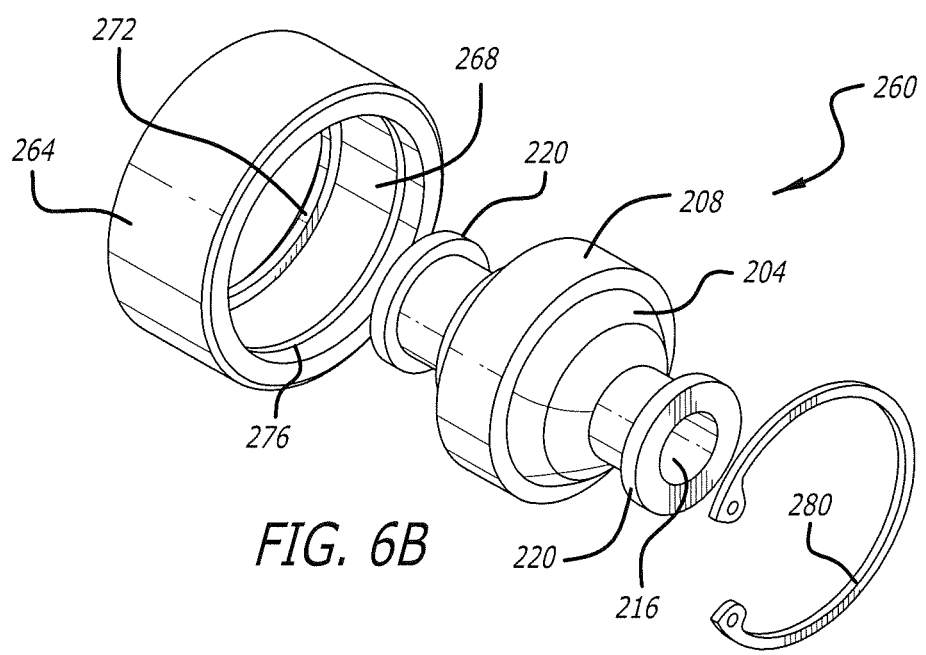
FIG. 6B illustrates an exploded isometric view of the monoball assembly of FIG. 6A.

FIGS. 6A-6B illustrate an exemplary embodiment of a monoball assembly 260 that may be coupled with the offset housing 202 to form the offset tie rod joint 188, as shown in FIGS. 4-5. The monoball assembly 260 includes the ball 204 retained within the casing 208, such that the ball 204 may be rotated within the casing 208. It is contemplated in many embodiments that sufficient lubrication may be made available to the ball 204 and the casing 208 to ensure advantageous operation of the monoball assembly 260, as described herein.

In the embodiment illustrated in FIG. 6B, a housing 264 including an opening 268 is configured to receive the casing 208, such that the ball 204 may be rotated with respect to the housing 264. The housing 264 may be fixedly coupled with the offset housing 202, such as, by way of example, welding the housing 264 within the opening 268 of the offset housing 202. In some embodiments, however, the offset housing 202 may be a forged piece that is configured to directly receive the casing 208 in absence of the housing 264 shown in FIGS. 6A-6B. For example, in such embodiments, the casing 208 may be inserted into the opening 268 of the offset housing 202 and retained therein by the backstop 272 and the snap-ring 280, as discussed with respect to FIG. 5. Once the monoball assembly 260 is coupled with the offset housing 202, the ball 204 may be rotated with respect to the steering rod 184 to which the offset tie rod joint 188 is coupled.

As further shown in FIG. 6B, a backstop 272 can be disposed at a rear end of the opening 268 of the housing 264, and a groove 276 that receives a snap-ring 280 may be disposed at a front of the opening 268. As will be appreciated by those skilled in the art, the backstop 272, the groove 276 and the snap-ring 280 cooperate to retain the casing 208 within the housing 264, as shown in FIG. 6A. It is contemplated, however, that in those embodiments wherein the offset housing 202 is a forged piece, as described with respect to FIG. 5, the opening 268 within the offset housing 202 may include a backstop and a groove that receives a snap-ring so as to retain the housing 264 within the offset housing 202, as shown in FIG. 4. Further, in some embodiments, the offset housing 202 may be configured to directly receive the casing 208 and the ball 204 in absence of the housing 264.

With continuing reference to FIGS. 6A-6B, the monoball assembly 260 may further comprise a bore 216 that can extend through the ball 204. The bore 216 is typically configured to receive the bolt 196, shown in FIGS. 3-4, to facilitate mounting the monoball assembly 260 to the spindle assembly 140. The bolt 196 may be passed through suitable threaded holes in the prongs 192 and through the bore 216 so as to fixate the ball 204 in the recess 182, as best shown in FIG. 4. With the ball 204 fixated between the parallel prongs 192, the spindle assembly 140 may be freely moved with respect to the steering rod 184 to which the monoball assembly 260 is coupled.

In some embodiments, a misalignment spacer 220 may be disposed on each of opposite sides of the ball 204. The misalignment spacers 220 can help ensure that the ball 204 remains centered within the recess 182, between the parallel prongs 192, while providing a relatively high degree of clearance for rotation of the ball 204 within the casing 208 and the offset housing 202. In some embodiments, the misalignment spacers 220 may be threaded or press-fitted into suitable countersunk holes in the ball 204. In some embodiments, the ball 204 and the misalignment spacers 220 may be machined as a single component comprising an extended ball that may be installed into the casing 208 during manufacturing of the monoball assembly 260.

It is contemplated that in some embodiments, a lubricating race may be incorporated into the monoball assembly 260 to ensure sufficient lubrication is available to the ball 204 and casing 208 during operation of the monoball assembly. For example, in some embodiments, a lubricating race may be disposed between the ball 204 and the casing 208 to ensure smooth and precise movement of the ball 204 within the casing 208. In some embodiments, a thin chamber may be disposed between the ball 204 and an interior of the casing 208. A suitable lubricant, such as a high-quality grease, may be disposed within the thin chamber to lubricate movement between the ball 204 and the casing 208. A lubrication fitting may be disposed in the casing 208 and in fluid communication with the thin camber to facilitate periodic replenishment of the lubricant within the thin chamber.

Moreover, in some embodiments, the monoball assembly 260 may be configured to have self-lubricating properties. For example, the ball and casing 204, 208 may be comprised of stainless steel that is treated with PTFE. It is contemplated that any of various PTFE-based formulations may be applied to the monoball assembly 260, without limitation. In some embodiments, PTFE-treated stainless steel balls and casings 204, 208 may be coupled with a lubricating race that is comprised of an injection molded Teflon impregnated Nylon race, without limitation.

It is further contemplated that certain embodiments of the monoball assembly 260 may be treated during manufacturing so as to optimize hardness, strength, durability, and longevity. In some embodiments, for example, the casing 208 may be machined via 4130 chromoly, or any suitable material. Likewise, the ball 204 may be comprised of 52100 bearing steel, or any suitable material. The ball and casing 204, 208 may, in many embodiments, be heat-treated and hard-chrome finished so as to improve strength and corrosion resistance, and the ball and casing 204, 208 may be cryogenically treated to improve hardness, durability, and wear resistance.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An offset tie rod joint for a vehicle steering system, the offset tie rod joint comprising:
   a ball rotatably retained within a casing;
   a housing including an opening that receives the casing wherein a rear of the opening includes a backstop and a front of the opening includes a groove configured to receive a suitably-sized snap-ring;
   a bore extending through the ball and configured to receive a bolt that is configured to fixate the ball between parallel prongs of a spindle assembly;
   a threaded shank fixedly coupled with the offset housing and configured to be received by a steering rod; and
   a misalignment spacer disposed on each of opposite sides of the ball and configured to provide clearance for rotation of the casing on the ball.

2. An offset tie rod joint for a vehicle steering system, the offset tie rod joint comprising:
   a ball rotatably retained within a casing;
   a housing including an opening that receives the casing wherein a rear of the opening includes a backstop and a front of the opening includes a groove configured to receive a suitably-sized snap-ring wherein the backstop and the snap-ring disposed in the groove are configured to retain the casing within the opening;
   a bore extending through the ball and configured to receive a bolt that is configured to fixate the ball between parallel prongs of a spindle assembly;
   a threaded shank fixedly coupled with the offset housing and configured to be received by a steering rod; and
   a misalignment spacer disposed on each of opposite sides of the ball and configured to provide clearance for rotation of the casing on the ball.

3. An offset tie rod joint for a vehicle steering system, the offset tie rod joint comprising:
   a ball rotatably retained within a casing;
   a housing including an opening that receives the casing;
   a bore extending through the ball and configured to receive a bolt that is configured to fixate the ball between parallel prongs of a spindle assembly wherein the bore and the bolt are configured to mount the ball to the spindle assembly, the bolt being configured to threadably extend through suitable threaded holes in the parallel prongs and through the bore so as to fixate the ball between the parallel prongs;
   a threaded shank fixedly coupled with the offset housing and configured to be received by a steering rod; and
   a misalignment spacer disposed on each of opposite sides of the ball and configured to provide clearance for rotation of the casing on the ball.

4. An offset tie rod joint for a vehicle steering system, the offset tie rod joint comprising:
   a ball rotatably retained within a casing;
   a housing including an opening that receives the casing;
   a bore extending through the ball and configured to receive a bolt that is configured to fixate the ball between parallel prongs of a spindle assembly;
   a threaded shank fixedly coupled with the offset housing and configured to be received by a steering rod; and
   a misalignment spacer disposed on each of opposite sides of the ball and configured to provide clearance for rotation of the casing on the ball wherein each misalignment spacer is configured to be received into a suitable hole in the ball.

* * * * *